United States Patent Office 3,384,318
Patented May 21, 1968

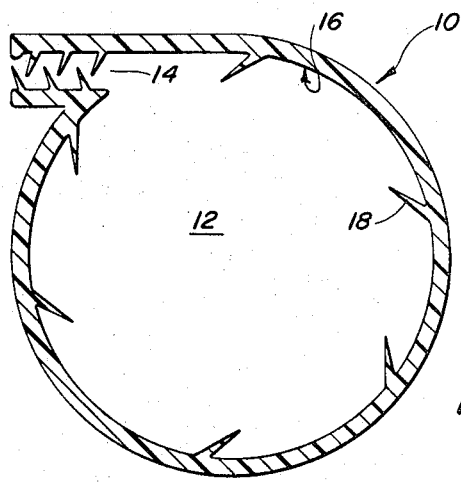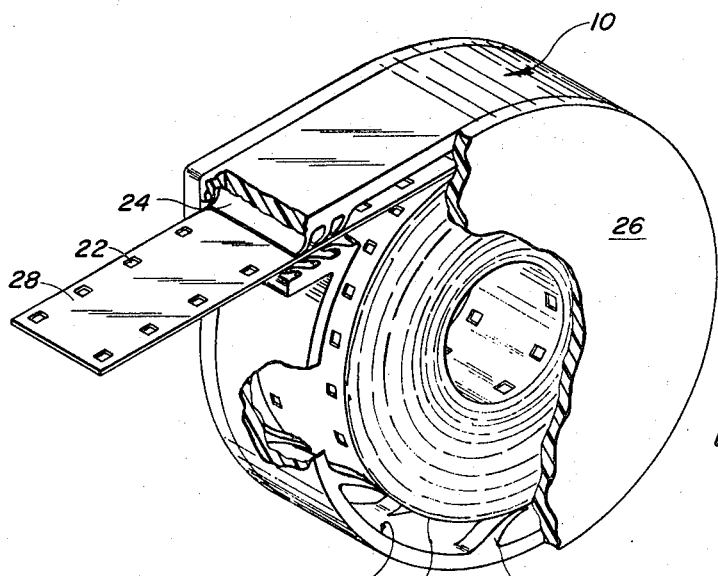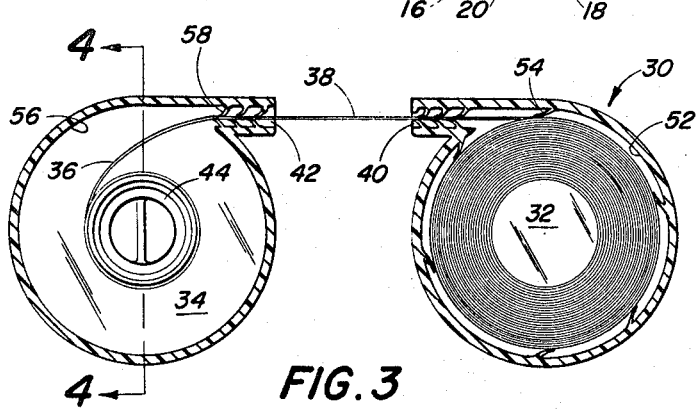

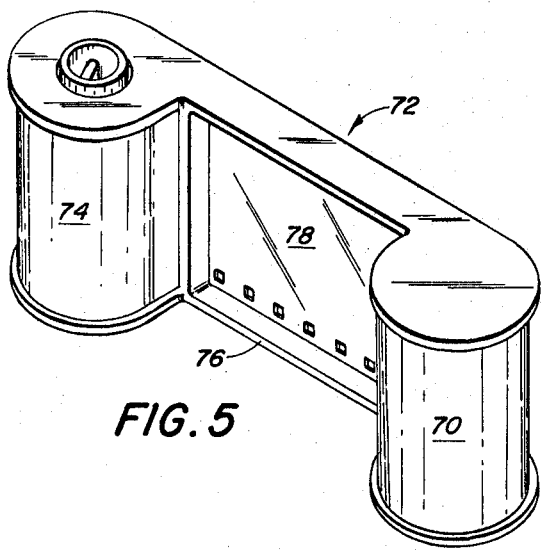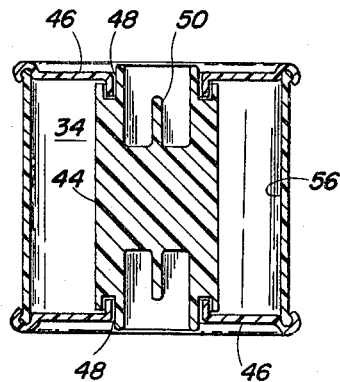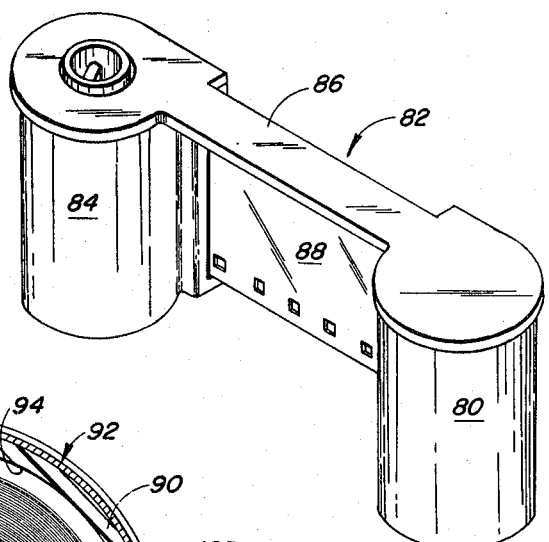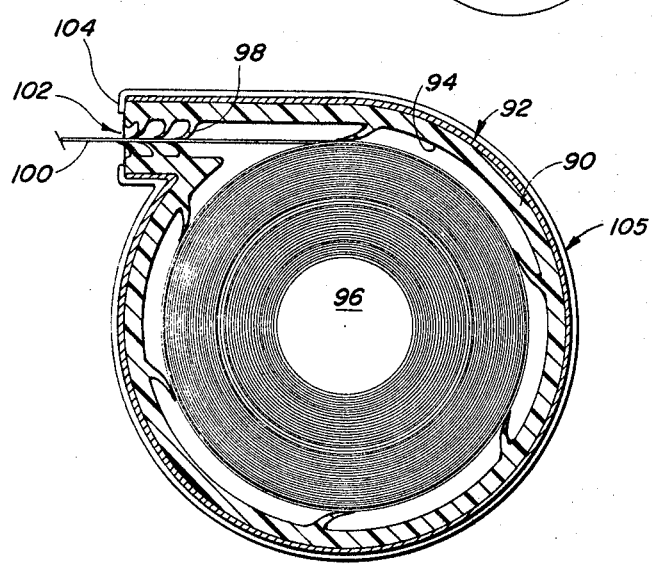

3,384,318
INTEGRALLY MOLDED FINS FOR STRIP
MATERIAL CARTRIDGE
Hubert Nerwin and Donald M. Harvey, Rochester, N.Y., assignors to Eastman Kodak Company, Rochester, N.Y., a corporation of New Jersey
Filed June 23, 1966, Ser. No. 559,962
14 Claims. (Cl. 242—71.1)

ABSTRACT OF THE DISCLOSURE

Flexible fins are integrally molded with and project inwardly away from the interior wall of a film cartridge to resiliently engage and space the film from the interior wall. The fins of the interior wall within the supply chamber portion of the cartridge restrict the clockspringing action of the film supply coil so as to minimize the torque required to initially withdraw film from the supply chamber. The fins of the interior wall within the gate portion of the cartridge engage and conform to the top and bottom surfaces of the film within the gate to form a light-tight seal.

---

The present invention is directed to a molded plastic cartridge which has a supply chamber for strip material in coiled form, and is specifically directed to the provision of flexible fins which will project inwardly from the interior walls of the cartridge supply chamber for engagement with the strip material. For purposes of this disclosure, a cartridge may have at least a supply chamber, and may also have a take-up chamber for receiving the strip material from the supply chamber.

It is known in the art to insert spring members within the take-up chamber of a cartridge to assist the coiling of the strip material upon itself as it is received therein. Usually there is no spool in the take-up chamber to which the leader of the strip material may be connected for winding up the strip material; hence the necessity of these spring members to assist the strip material in coiling upon itself. These spring members may take the form of a single coiled member which will engage the outer convolution of the coil of strip material; or may take the form of a plurality of separate spring members spaced at intervals within the take-up chamber. When such strip material is in the form of a light-sensitive film having perforations along the marginal edges, it is also known to have the spring members contact the film coil only in the area of the perforations.

It is not as well known, however, to provide spring members in the supply chamber of a cartridge unless the supply chamber will also serve at a later time as a take-up chamber. The reason for this is that the strip material is usually inserted by the manufacturer in pre-coiled form axially through a side end opening in the cartridge before the opening is sealed by an end cap or the like. The strip material is then withdrawn as it is used from the cartridge through another opening or gate that is as long as the strip material is wide and which is slightly larger in width than the thickness of the strip material.

Due to the inherent elasticity of some strip materials when inserted into a cartridge supply chamber, particularly when in a tight spoolless coiled form, there is a tendency for the tightly coiled strip material to clockspring or to expand to produce a coil of greater diameter than the inside diameter of the cartridge. This results in a great amount of radial pressure being exerted by the outer convolution of strip material against the inner wall of the cartridge. This radial pressure is accentuated if the cartridge containing the strip material is subjected to vibration. It then requires a greater initial effort to withdraw the strip material before the coil diameter can be reduced. The outer coil of the strip material also has a large surface area which is in frictional contact with the interior wall of the chamber.

Accordingly, one of the objects of the invention is to minimize frictional contact of the outer convolution of radially expanding coil of strip material with the interior wall of a cartridge supply chamber by providing flexible fins which project inwardly from the interior wall for engaging the strip material to restrict the expansion of the strip material coil.

Another object is to provide flexible means in a cartridge supply chamber to minimize the torque required to withdraw the strip material from the supply chamber.

It is also known to provide some type of fabric such as velvet or what is often known as "plush" in the gate of cartridges containing light-sensitive strip material in the form of film strip to minimize light-fogging of the film strip. It is recognized, however, that plush is not entirely effective against all bright lights. The plush is made up of fibers adhesively secured to these opposite wall surfaces of the cartridge that define the gate. It is possible that through capillary action some of the adhesive may follow along the length of one or more of the fibers so that when the adhesive is dry these particular fibers will not closely conform to the surface of the film strip sufficiently to exclude all light entry. Often too, some of the fibers projecting from each of the two opposing surfaces of the gate may become inclined in different directions which may permit light entry. For these and other reasons, film manufacturers often carry a warning on the film box label to the effect that the film cartridge should not be loaded into the camera in strong sunlight.

Accordingly, still another object is to provide flexible means in the gate of a cartridge which will interfere with the straight line passage of the film strip from or to the cartridge chamber so that the flexible means will bend against the opposite sides of the film strip in the gate to assure good contact between the film strip and the flexible means to establish an effective light-lock.

These and other objects inherent in the character of the invention disclosed will become apparent from the following description and the drawings that constitute part of the disclosure.

In the drawings:

FIG. 1 is a cross-sectional view in elevation of a supply chamber of a cartridge;

FIG. 2 is an enlarged perspective view of the supply chamber of a cartridge, including a coil of film strip, and showing one of the cartridge end covers partly broken away to illustrate the relation of the fins to the film strip, both in the supply chamber and the gate of the cartridge;

FIG. 3 is a cross-sectional view in elevation of another cartridge construction and illustrating a coil of strip material in the supply chamber with a leader extending from the supply chamber and connected to a hub in a take-up chamber, and further illustrating the cooperation of the fins with the strip material;

FIG. 4 is a cross-sectional view of the hub and take-up chamber taken along line 4—4 of FIG. 3 and further illustrating end caps in cross-section but without the strip material;

FIG. 5 illustrates a perspective view of still another cartridge construction and the film strip passing between structurally-connected chambers of the cartridge;

FIG. 6 illustrates a perspective view of another cartridge construction having structurally connected chambers and a film strip passing between the chambers; and FIG. 7 is a cross sectional view in elevation of a further cartridge construction illustrating a supply chamber web insert within a cartridge and a coil of strip material.

The cartridge of the invention has at least one chamber that constitutes a supply chamber which is arranged to contain a supply of stirp material in coiled form, and has a gate through which the strip material will be withdrawn from the supply chamber. The invention is directed to the provision in the supply chamber of a cartridge of this construction of flexible fins which are integral with and project from the interior wall of the cartridge and which are arranged to resiliently engage the strip material and space the strip material from the interior wall.

In reference now to the darwings, in FIG. 1 a cartridge 10 is illustrated which is molded from plastic such as polypropylene. The cartridge has a supply chamber 12 and a gate 14 leading from the supply chamber, both defined by the interior wall 16. Flexible fins 18 are molded integrally with and project inwardly away from the interior wall. Each fin is tapered from a relatively thick section at the interior wall to a relatively thin section where it bears in engagement with the strip material.

Although the fins within the supply chamber may project radially (not shown) from the interior wall, i.e. toward the center of the supply chamber; it is preferable that the fins be angularly inclined with respect to the interior wall at an angle less than 90° on one side of each fin. This angular inclination is to assure that there will be no possibility that one or more of the fins might be deflected in a direction different from the others and thus act in opposition to the others when the coil of strip material is loaded in the supply chamber and an attempt is made to withdraw the strip material. The coil is thus resiliently supported out of contact with the interior wall in engagement with the supply chamber fins. Although the fins may extend across the axial length of the cartridge, in FIG. 2 the preferred construction of the supply chamber fins is illustrated as comprising pairs of fins of such length in the axial direction of the cartridge as to engage only at the two marginal edges of the coiled strip material 20. When such strip material is a light-sensitive film strip, the length of each of the pairs of fins in the axial direction of the cartridge will only be sufficient to engage the film strip in the area of the perforations 22 at each edge.

The fins within the gate 14 extend the axial length of the gate as shown at 24 in FIG. 2, and preferably project from and are angularly inclined with respect to the interior wall at an angle less than 90° on one side of each fin. The angular inclination is in a direction away from the supply chamber. This angular inclination of the fins also serves to interfere with the strip material returning to the supply chamber, which might otherwise occur, for example, as a result of any clockspringing of the coil. The fins on the side of that part of the interior wall that defines the gate are spaced in offset manner with respect to the fins on the opposite side of that part of the interior wall that defines the gate. The opposed fins overlap each other so as to interfere with the straight line passage of the strip material when it passes through the gate. The result of this interference is the bending of the gate fins in their engagement with the strip material, thus assuring good contact between the strip material on either side of the strip material and the gate fins. The gate thus establishes an effective light lock with the strip material when the latter is in the gate.

In operation of the cartridge construction disclosed in FIGS. 1 and 2, the strip material 20 is loaded in tightly coiled form through a side opening in one end of the cartridge 10 before sealing such opening in suitable manner by an end cap 26 or the like. An end 28 of the strip material is extended through the gate 14 in preparation for withdrawing the strip material from the supply chamber 12. The fins 18 restrict the clockspringing or radial expansion of the coiled strip material into contact with the interior wall 16 so that the torque required to withdraw the strip material from the supply chamber will be minimized. The fins thus resiliently support the coil of strip material so that the coil may give in the direction of strip material movement. Since the area of contact between the fins and the strip material is considerably reduced from what it might have been if the outer convolution of the coil had been permtited to expand radially into contact with the interior wall, the frictional contact which would otherwise also have to be overcome before the strip material could be withdrawn is minimized.

In FIG. 3 a cartridge 30 is disclosed as a unitary or factory-loaded package having a supply chamber 32, a take-up chamber 34 with the two chambers being initially spaced a predetermined distance apart, such as in preparation for loading into correspondingly spaced chambers of a camera, by the leader 36 of the strip material 38 extending between the chambers. The leader extends from the supply of coiled strip material in the supply chamber through the supply chamber gate 40, through the take-up chamber gate 42 where the end of the leader is connected in a suitable manner to take-up core 44. As illustrated in FIG. 4, the take-up core is rotatably supported by the end caps 46 of take-up chamber by annular bearings 48. The take-up core may be engaged at 50 by a suitable clutch driving mechanism (not shown) for winding up the strip material on the take-up core.

The coil of strip material 38 is resiliently supported out of contact with the interior wall 52 of the supply chamber by flexible fins 54, which are angularly inclined in the same manner as discussed with respect to FIGS. 1 and 2. The gate fins are also angularly inclined in a direction away from the supply chamber as the supply chamber described in FIGS. 1 and 2. Since the strip material wound upon take-up core 44, there will be no necessity for fins in the take-up chamber 34 but the interior wall 56 will be provided with fins 58 within that part defining the take-up chamber gate 42. These fins preferably have an angular inclination in a direction toward the take-up chamber so that the opposition to the strip material passing therethrough toward the take-up chamber will be minized. This angular inclination will also serve to interfere with the strip material passing back out of the take-up chamber if there should be such tendency due to, for example, any clockspringing action of either the supply or take-up coils. The fins 58 form a light-lock with the strip material when the strip material is in the take-up chamber gate 42. The operation and loading of the structure shown in FIGS. 3 and 4 will be substantially the same as that for the cartridge construction of FIGS. 1 and 2 except for the connection of the end of the leader 36 to the take-up core 44.

FIGS. 5 and 6 illustrate two other forms of cartridge construction that the unitary factory-loaded package of FIGS. 4 and 5 take and which would be provided with flexible fins integral with the interior wall of each cartridge in similar manner as disclosed in FIGS. 3 and 4.

In FIG. 5 the supply chamber 70 of the cartridge 72 is connected to the take-up chamber 74 by an intermediate member 76. The intermediate member serves to space and to connect the two chambers and to support, to guide and to back the strip material 78 as the strip material passes between the two chambers.

In FIG. 6 the supply chamber 80 of the cartridge 82 is connected to the take-up chamber 84 by an intermediate member 86. The intermediate member serves to space and to connect the two chambers while the backing and the guiding support for the strip material 88 is furnished, for example, by camera structure (not shown) in which the unitary or factory-loaded package may be inserted.

FIG. 7 illustrates still another cartridge construction. An integrally formed web insert 90 is inserted through a side opening in the end of a cartridge 92. This web insert thus forms the interior wall 94 of the supply chamber 96 of the cartridge from which flexible fins 98, integral with the interior wall, project in a manner similar to that disclosed in the cartridge constructions of FIGS. 1 and 3. The strip material 100 is resiliently supported in coiled form by the fins 98 in the manner previously described. The fins in the gate 102 form a light-lock with the strip material, also in the manner previously described. The flanged lips 104 of the cover 105 of the cartridge 92 hold and lock the sides of the supply chamber gate 102 a predetermined spaced distance apart. Except for the fact that FIG. 7 discloses a web insert to be installed within a cartridge construction, when the strip material is inserted in strip form the operation is also similar to that previously described with respect to the other cartridge constructions described above. The strip material may be arranged to be inserted within the web insert 90 either before the web is inserted in the cartridge or afterwards.

Although the foregoing description relates to a specific embodiment of the invention, it is obvious that variations and modifications thereof can be effected within the spirit and scope of the invention. Accordingly, the present disclosure is to be considered as illustrative and not as limiting the scope of the invention which is defined by the following claims.

I claim:
1. An article comprising a molded supply cartridge having an interior wall which defines a supply chamber for containing a supply of strip material in coiled spoolless form, and having a plurality of flexible fins integrally molded with said interior wall, said fins slanting in the direction which said strip material moves when being removed from said supply chamber, said fins projecting inwardly a relatively small fraction of the distance from said interior wall to the center of said supply chamber and away from said interior wall, said fins being arranged to prevent the outer convolution of said strip material from coming into contact with said interior wall.

2. An article comprising a molded supply cartridge having an interior wall which defines a supply chamber for containing a supply of strip material in coiled form, and having a plurality of flexible fins integrally molded with said interior wall, said fins slanting in the direction which strip material moves when being removed from said supply chamber, said fins projecting inwardly a relatively small fraction of the distance from said interior wall to the center of said supply chamber and away from said interior wall, said interior wall further defining a gate through which an end of said strip material may pass from said supply chamber, said gate also having a plurality of flexible fins integrally molded with said interior wall, said fins in said gate slanting in the direction which said strip material moves when being removed from said supply chamber, and projecting inwardly away from said interior wall, each of said fins terminating in a free end out of contact with any other part of said cartridge.

3. A molded cartridge as defined in claim 2, said gate being defined in part by and having upper and lower opposed sides, and said flexible fins within the gate extending from each of said opposed sides and across the axial length of the gate.

4. A molded cartridge as defined in claim 3, said flexible fins within the gate extending from each of said upper and lower sides toward the opposite sides in opposed offset relation so as to interfere with the straight line passage of the strip material from said supply chamber.

5. An article comprising a molded supply cartridge having an interior wall which defines a supply chamber for containing a supply of strip material in coiled spoolless form, and having a plurality of flexible fins integrally molded with said inner wall, said fins slanting in the direction which said strip material moves when being removed from said supply chamber said fins projecting inwardly a relatively small fraction of the distance from said interior wall to the center of said supply chamber and away from said interior wall, a coiled spoolless form of strip material disposed within said supply chamber, said fins being arranged to prevent the outer convolution of said strip material from coming into contact with said interior wall.

6. A molded cartridge as defined in claim 2, said cartridge further having strip material in coiled form within said supply chamber and an end of the strip material passing from the supply chamber through said gate, and said flexible fins resiliently engaging said strip material at spaced intervals and spacing said strip material from said interior wall.

7. A molded cartridge as defined in claim 5, said strip material having perforations at its two marginal edges and said flexible fins in said supply chamber comprising pairs of fins of such length in the axial direction of the cartridge as to engage said strip material only at said two marginal edges.

8. An article comprising a molded supply cartridge having an interior wall which defines a supply chamber for containing a supply of strip material in coiled form and which further defines a gate through which an end of said strip material may pass from said supply chamber, said gate being defined in part by and having upper and lower opposed sides, said interior wall having flexible fins integrally molded with said interior wall, said fins slanting in the direction which said material moves when said material is removed from said chamber, and said fins projecting inwardly away from each of said sides of the gate toward the opposite side, each of said fins terminating short of the fins projecting from the opposite side, said fins cooperating in such manner as to interfere with the straight line passage of said end of the strip material in the gate.

9. A molded cartridge as defined in claim 8, said flexible fins extending from each of said upper and lower sides toward the opposite side in opposed offset relation.

10. A molded cartridge as defined in claim 9, said cartridge further having strip material in coiled form disposed within said supply chamber and an end of the strip material passing from the supply chamber through said gate and said flexible fins resiliently engaging said end of the strip material in the gate on each side along the axial length of the gate in such manner as to form a light-lock with the strip material to prevent entry of light into the supply chamber.

11. An article comprising a cartridge for containing strip material in coiled spoolless form and having a molded insert, said insert conforming to the interior contour of the cartridge and having an interior wall and flexible fins integrally molded with said interior wall, said flexible fins slanting in the direction which said material moves when it is being removed from said cartridge, said flexible fins projecting inwardly a relatively small fraction of the distance from said interior wall to the center of said cartridge and away from said interior wall and arranged to resiliently engage said strip material at spaced intervals around the insert and to space said coiled spoolless strip material from said interior wall when the strip material is disposed within the cartridge.

12. An article comprising a molded cartridge having a first interior wall which defines a supply chamber for containing a supply of strip material in coiled form and a gate through which an end of the strip material may pass from the supply chamber, and a second interior wall which defines a take up chamber for receiving strip material from said supply chamber and a gate through which strip material may pass into said take-up chamber, each of said gates being defined in part by and having upper and lower opposed sides, and further having flexible fins integrally molded with each of said first and second interior walls, said flexible fins in each gate projecting inwardly away from each of said upper and lower sides toward the opposite side in such manner as to interfere with the straight line passage of the strip material when said material is within said gates, each of said fins terminating short of the fins projecting from the opposite side and each of said fins slanting in the direction which said material moves when being removed from said supply chamber.

13. A molded cartridge as defined in claim 12, said cartridge further having strip material in coiled form disposed within said supply chamber and an end of the strip material passing from the supply chamber through the supply chamber gate, said end of the strip material further passing through the take-up chamber gate for suitable connection within said take-up chamber and subsequent winding up within said take-up chamber into a coiled form, said strip material and said flexible gate fins forming a light-tight seal when the strip material is in said gates.

14. A molded cartridge as defined in claim 12, said supply chamber interior wall also having flexible fins integrally molded with said interior wall and slanting in the direction which said strip material moves when being removed from said supply chamber and projecting inwardly a relatively small fraction of the distance from said interior wall to the center of said supply chamber away from said interior wall.

References Cited

FOREIGN PATENTS

| | | |
|---|---|---|
| 1,073,297 | 1/1960 | Germany. |
| 1,897,740 | 7/1964 | Germany. |
| 1,916,187 | 5/1965 | Germany. |

FRANK J. COHEN, *Primary Examiner.*